United States Patent [19]

Fultz

[11] 4,078,192

[45] Mar. 7, 1978

[54] SYNTHESIZER FOR MULTIPHASE WAVEFORMS

[75] Inventor: Jack V. Fultz, Thousand Oaks, Calif.

[73] Assignee: Pertec Computer Corporation, Los Angeles, Calif.

[21] Appl. No.: 699,613

[22] Filed: Jun. 24, 1976

[51] Int. Cl.² .............................................. H02P 5/40
[52] U.S. Cl. ................................... 318/227; 318/314; 318/341; 363/42
[58] Field of Search .............. 318/314, 341, 227, 318, 318/175, 230, 231; 321/9 A, 61, 69 R; 307/271, 269, 265

[56] References Cited

U.S. PATENT DOCUMENTS

| | | | |
|---|---|---|---|
| 3,816,808 | 3/1974 | Enslin et al. | 318/231 |
| 3,946,293 | 3/1976 | Feld | 318/318 |
| 3,947,736 | 3/1976 | Byers | 318/227 |

Primary Examiner—Herman J. Hohauser
Attorney, Agent, or Firm—Lindenberg, Freilich, Hornbaker, Wasserman, Rosen & Fernandez

[57] ABSTRACT

A synthesizer for multiphase waveforms is disclosed which is useful, for example, in open and closed loop control of a two-phase induction motor, such as for a magnetic recording disk spindle, utilizing a plurality of bistable elements, two for each phase, to control output power drivers. A single clock pulse counter is employed to time the setting and resetting of each bistable element according to some predetermined pattern controlled by combinational logic which presets the counter to proper values at appropriate times in response to external stimuli, such as speed feedback control and start-stop control.

21 Claims, 5 Drawing Figures

SYNTHESIZER FOR MULTIPHASE WAVEFORMS

BACKGROUND OF THE INVENTION

This invention relates to a synthesizer for complex multiphase waveforms, and more particularly to a digital system for producing a plurality of binary (high and low level) waveforms wherein the intervals during which a particular waveform is high may be set independent of other waveforms, and the extent of the intervals themselves may be set at any value within the longest interval a fixed length counter can time by counting clock pulses.

There are many applications that require control of the relative phase of a plurality of binary waveforms where the high and low states of the waveforms are not symmetrical, i.e. where the interval that a given waveform is low is not equal to the interval that the waveform is high, and there is some phase relationship to be controlled between waveforms. The term "binary waveform" thus means that each waveform may have only one of two levels at any given time, a high level such as +3V and a low level such as zero volts. The interval during which a waveform is high may be termed "active time". The term "multiphase waveform", as used herein, refers to a waveform in which the intervals of the active times can be selected. The rate at which the active times occur, as well as the intervals of the active times, must often be controlled in complex situations while at the same time controlling the relative phase between a plurality of binary multiphase waveforms.

An example of such a complex situation to be described by way of example in a specific embodiment, and not by way of limitation, is synthesizing multiphase waveforms for controlling the speed of a 2-phase induction motor. Each of two field windings is energized via an output power driver by two paired binary waveforms that have non-coincident active times. The output power driver employs solid state switches for switching the polarity of DC power applied. Since the load presented to the output power driver is inductive, there is a need for a dead time between phase active times in each of the two paired waveforms, i.e., a time during each half power cycle when neither one of two paired waveforms is high in order to protect the switches in the output power driver. This adds to the complexity of controlling the active times of one pair of waveforms in a predetermined phase relationship with respect to the other pair of waveforms for the second field winding of the motor. Consequently, in one set of four binary waveforms it is necessary to control the active times of one pair of waveforms with respect to each other and with respect to the other pair.

SUMMARY OF THE INVENTION

In accordance with a preferred embodiment of the invention, one or more binary multiphase waveforms are synthesized for a load, such as a 2-phase induction motor, using an interval counter to count predetermined numbers of clock pulses from a stable source. The numbers of clock pulses to be counted for the intervals from which the binary waveforms are synthesized are stored by suitable programming means, and are selected one at a time from the programming means by selecting means responsive to a phase timing signal at the output of the interval counter and a control signal from a suitable source, such as a source responsive to an external switch for open-loop control or a transducer responsive to operation of the load for closed-loop control. Synthesizing means responsive to the phase timing signal includes a bistable element for each waveform, each bistable element being clocked by the phase timing signal from the interval counter in a predetermined cyclic pattern. In some applications, that pattern has a subcyclic pattern, in which case the selecting means includes a subcycle counter for counting the phase timing signal, and includes means for combining the states of the subcycle counter and at least one control signal to select a predetermined number from the programming means to be preset into the interval counter. Thus each time the interval counter counts a predetermined number of clock pulses, the phase timing signal at its output causes it to be preset to one of a plurality of numbers selected from the programming means to set the interval before the next phase timing signal is to be produced in response to the selecting means which in turn responds to both external stimuli and the output of the subcycle counting means. Each time the interval counter is preset, it is dedicated to timing the interval to the next time a bistable element is to be set or reset. The individual outputs of the bistable elements constitute the predetermined pattern of binary waveforms.

When the load is a 2-phase induction motor, four binary waveforms are generated by setting four bistable elements in sequence and resetting them in the same sequence such that, after one is set, the one of the others already set for the longest interval is reset. The bistable elements are thus basically phase staggered by 90° such that the first and third are 180° out of phase, and the second and fourth are 180° out of phase, but the beginning of each cycle of each multiphase waveform is delayed by a predetermined interval timed by the interval counter in response to a constant number selected to the preset into the interval counter during the first half of a 2-phase subcycle as determined by a subcycle counter. During the second half of each 2-phase subcycle, a second number is selected to be entered into the interval counter for the interval desired before resetting the bistable element to be reset next. Motor speed is controlled by selecting the value of this second number.

The novel features of the invention are set forth with particularity in the claims. The invention will best be understood from the following description when read in conjunction with the accompanying drawings.

DESCRIPTION OF PREFERRED EMBODIMENTS

Figure 1:
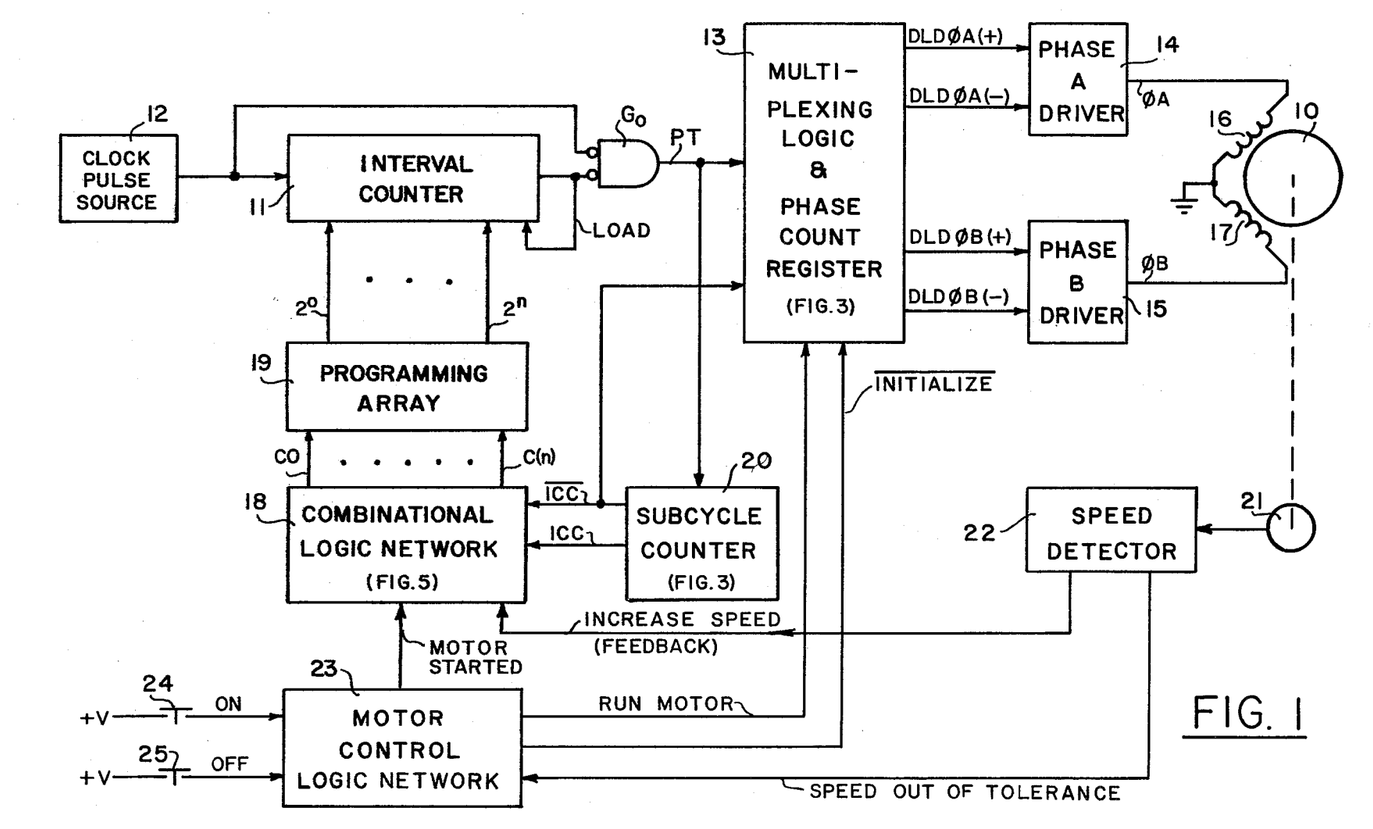
FIG. 1 is a block diagram of the present invention in an exemplary application.

Referring to FIG. 1, a 2-phase induction motor 10 is shown for an exemplary application of the concept of the present invention, which is to generate complex multiphase waveforms using an interval counter 11, which counts clock pulses from a source 12, and a phase count register with input multiplexing logic represented by a functional block 13 to control output power drivers 14 and 15 for field windings 16 and 17 of the motor. Operation of the interval counter in producing synchronized phase timing (PT) pulses via a gate $G_0$ is under control of combinational logic network 18 which presets the counter to some predetermined number, via a programming array 19, each time a PT pulse is generated by an overflow of the interval counter.

Successive intervals to be timed by the counter 11 are not of equal duration. Consequently, to keep track of the number to be loaded next into the interval counter, a subcycle counter 20 counts the PT pulses. In this exemplary application of the invention, the subcycle counter need count only two subcycles in the cyclic pattern of the complex waveforms to be generated by the multiplexing logic and phase count register 13. The complex waveforms generated in the phase count register (comprised of a plurality of bistable elements, one for each waveform) control the output power drivers 14 and 15 to drive the motor. A tachometer 21 generates a signal which is detected by a speed detector 22 to generate a feedback signal related to motor speed.

As will be described more fully hereinafter with reference to FIG. 5, the nature of the feedback control in this exemplary application is simplified to control the speed of the motor about the nominal value of the desired speed, and to detect within the detector 22 when the actual speed has dropped below the desired speed. At that time an "increase speed" indication is produced in the feedback signal by raising it from a low logic level to a high logic level. The combinational logic network 18 will then cause all intervals timed by the counter 11 to be shortened to increase motor speed. Once the actual speed of the motor increases above the desired nominal value, the feedback signal is lowered (i.e., the "increase speed" indication is removed) and the intervals timed by the counter 11 will be restored to again drive the motor at a speed slightly less than the nominal value desired. The result is an average speed of the motor that is controlled to the desired value. It will be evident to those skilled in the art that an analog feedback signal proportional to the speed of the motor may be quantized in steps of virtually any incremental size desired to provide proportional speed control through the combinational logic by simply expanding the combinational logic network 18 to respond to the different quantized feedback signal levels. Each quantized level could then call out a different number to be preset into the counter 11. In either case, the numbers to be called out by the combinational logic are stored in the programming array.

If in this exemplary application of the invention the speed of the motor exceeds an upper or lower tolerance value, a signal is transmitted by the detector 22 to a motor control logic network 23 which responds by shutting off the motor. This is accomplished by changing the logic state of a "run motor" signal when the out of tolerance condition is detected. The motor control logic network also provides a signal "motor started" in this exemplary application. When the motor is being started, in response to the first pushing of a start switch 24, the motor control logic does not initially assert a true condition on the "motor started" signal. The combinational logic 18 selects different numbers to be preset into the interval counter 11, according to the state of the "motor started" signal.

This provides the capability to use a different motor excitation frequency during starting of the motor than is used for running the motor at a desired speed.

Once the speed detector 22 senses that the motor has started, has come up to the desired speed, and is within the speed tolerance, the motor control logic network 23 will respond to the false condition on the "speed out of tolerance" signal line by asserting a true condition on the "motor started" line.

It will be evident to those skilled in the art that a plurality of frequencies could be selected during starting or stopping of the motor by expanding the capabilities of the speed detector 22, motor control logic network 23, combinational logic network 18, and programming array 19.

In its simplest form, the motor control logic network 23 may contain a set-reset flip-flop which is set to turn the motor on by pushing a start switch 24, and reset by the out-of-tolerance signal. To manually shut off the motor by resetting the flip-flop, a push button 25 is momentarily depressed.

To better appreciate the application of the invention illustrated in FIG. 1 before describing an exemplary embodiment, the nature of the complex waveforms to be generated will be described with reference to FIG. 2 wherein the first two waveforms illustrate the conventional 90° out-of-phase timing of power applied to the motor winding 16 and 17. Those conventional timing waveforms could be generated by the multiplexing logic and phase count register of the functional block 13 with the period of each timed by the interval counter 11. For each timing waveform there would be a complementary (inverted) waveform generated directly from the waveforms shown for use in the output power drivers for the second (negative) half of each phase. The result would be two pairs of waveforms 90° out of phase, with the waveforms in each pair 180° out of phase. However, it is preferred to delay the beginning of each active time in each pair of waveforms as shown by the waveforms DLD $\phi A(+)$ and DLD $\phi A(-)$ for phase-A control, the waveforms DLD $\phi B(+)$ and DLD $\phi B(-)$ for phase-B control. The delay ($\delta$) in each instance is indicated with respect to the conventional phase timing waveforms, and the length of the delay timed by the interval counter 11 is enabled by the combinational logic network 18 via the programming array 19.

Figure 2:
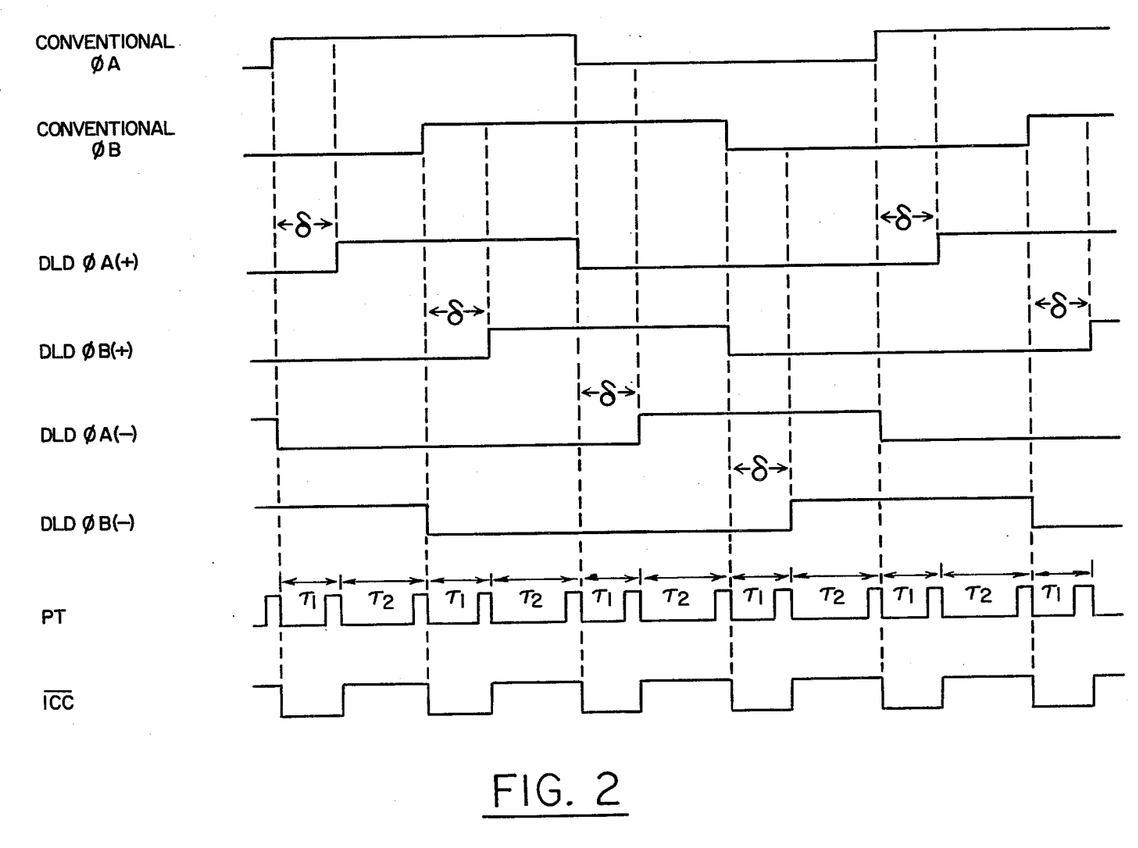
FIG. 2 is a timing diagram illustrating conventional waveforms for the application of FIG. 1, and complex waveforms for the same application generated in accordance with the present invention.

It should be noted that the counter emits a phase timing pulse PT via the gate $G_0$ at the end of each interval that precedes a delay interval, and at the end of each delay interval, as shown by the waveform labeled PT in FIG. 2 From that PT waveform it is easily seen that the cyclic pattern of the four waveforms to be generated with delays is comprised of delay intervals of time $\tau_1$ alternated with power control intervals $\tau_2$. Each pair of consecutive intervals, $\tau_1$ and $\tau_2$, constitutes a subcycle which can be easily counted by the subcycle counter 20 using a single stage binary counter, such as a J-K flip-flop connected to function like a T-type flip-flop with a logic one level at each of the J and K input terminals.

The output of the subcycle counter 20 is an interval counter control signal, $\overline{ICC}$, shown in FIG. 2. Both that signal and its complement, ICC, are applied to the combinational logic network 18 to alternately preset the counter 11 for the interval $\tau_1$ and the interval $\tau_2$ as will be described with reference to FIG. 5. The signal $\overline{ICC}$ is also applied to the multiplexing logic 13 to effectively control the distribution of the timing intervals, $\tau_1$ and $\tau_2$, in synthesizing the delayed timing waveforms shown in FIG. 2.

Figure 3:
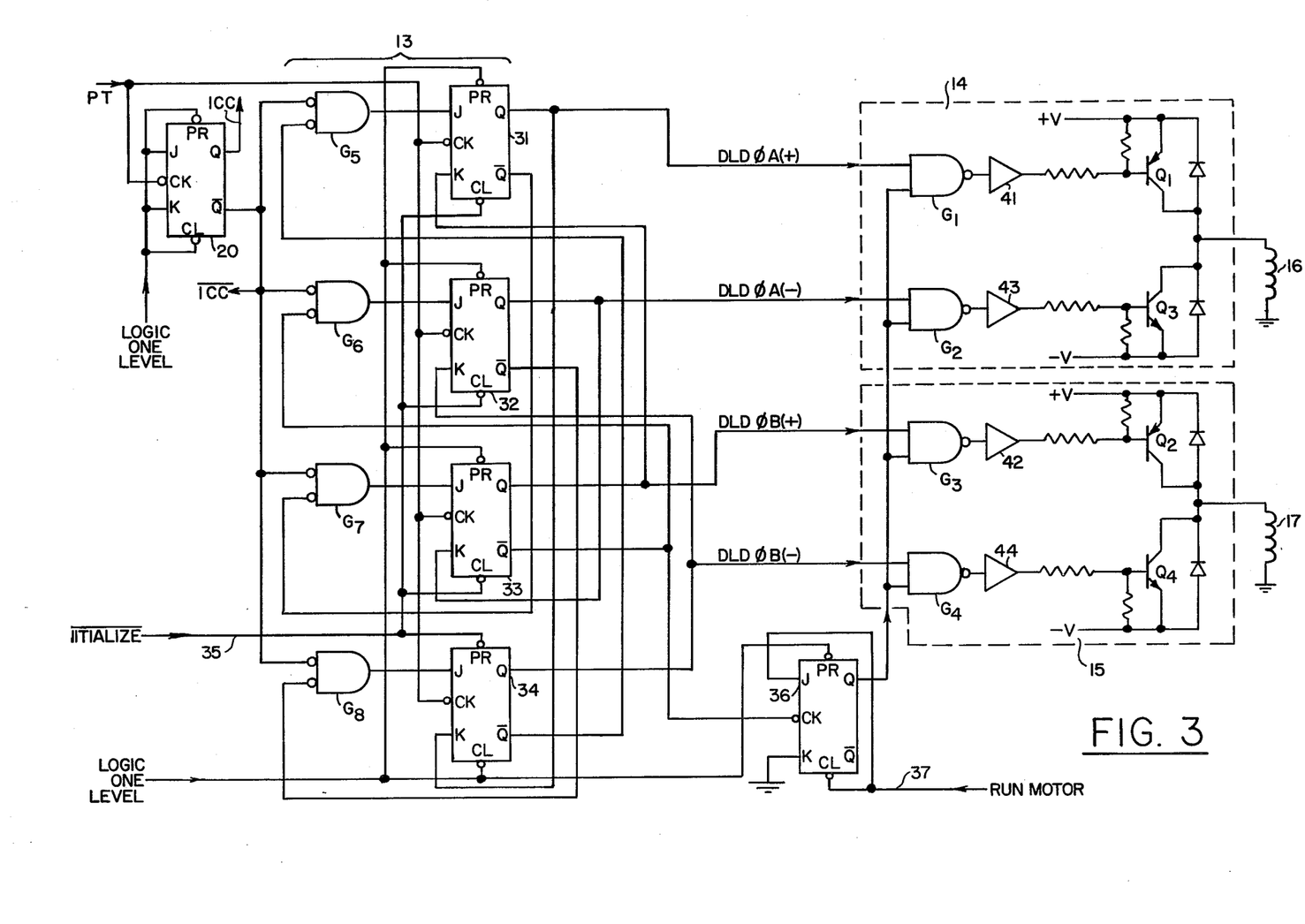
FIG. 3 is a logic diagram of a phase count register and subcycle counter with multiplexing logic for generating the complex waveforms of FIG. 2.

Referring now to FIG. 3, the timing intervals $\tau_1$ and $\tau_2$ timed by the interval counter 11 (FIG. 1) are employed to synthesize the four delayed waveforms of FIG. 2 through the setting and resetting of four bistable elements comprised of J-K flip-flops 31 through 34. That is accomplished in this exemplary embodiment by controlling the J and K input terminals of the flip-flops as shown.

Flip-flops 31 and 32 generate the respective waveforms DLD $\phi A(+)$ and DLD $\phi A(-)$, while flip-flops 33 and 34 generate the respective waveforms DLD $\phi B(+)$ and DLD $\phi B(-)$. All of the flip-flops are initialized by a signal, $\overline{INITIALIZE}$, on line 35 from the motor control logic network 23 when power is turned on for the electronic circuits. A flip-flop 36 is set to the logic one state when the "run motor" signal is true, to enable NAND gates $G_1$ through $G_4$. The flip-flop 36 remains set as long as its J input terminal continues to receive a "run motor" signal, because its K input terminal is tied to a logic zero level (ground) signal, so that each time the $\overline{Q}$ output of the flip-flop 33 goes negative, the flip-flop 36 will be clocked to the set state in which it already is.

This effectively starts the drivers 14 and 15 at the beginning of the waveform DLD $\phi B(+)$ while the waveforms DLD $\phi A(-)$ and DLD $\phi B(-)$ are low. The "run motor" signal received over line 37 is from the motor control logic network 23. When the motor is turned off, the signal over that line goes low and clears the flip-flop 36 to disable the gates $G_1$–$G_4$. Thereafter, the flip-flop 36 will remain cleared until the logic level of the line 37 is again raised to a logic one level.

Figure 4:
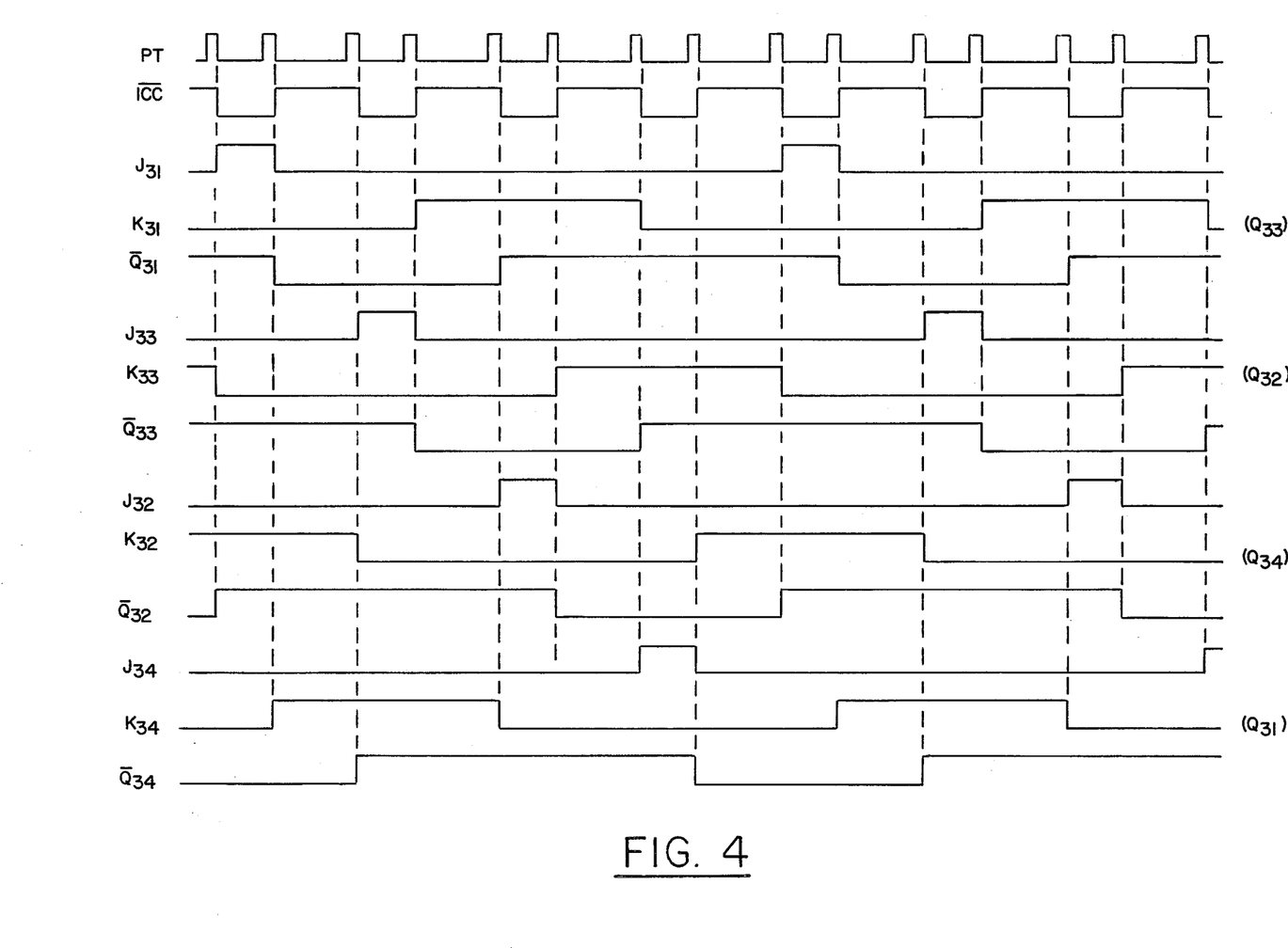
FIG. 4 is a timing diagram useful in understanding the operation of the phase count register and subcycle counter of FIG. 3.

The logic for the J input terminals of the flip-flops 31 through 34 are implemented with NOR gates $G_5$–$G_8$. Each time a phase timing pulse PT is generated by the interval counter 11, thus indicating that some phase change is necessary in the complex waveforms, one of the flip-flops 31 through 34 will change state. FIG. 4 shows the control signals at the J and K input terminals and the output signals at the $\overline{Q}$ terminals of the flip-flops. It should be noted that the enabled gates $G_1$ through $G_4$ invert the Q outputs of the flip-flops to effectively provide to output power drivers the $\overline{Q}$ output signals of the flip-flops. It is for that reason that the $\overline{Q}$ output signals are shown in FIG. 4. It should also be noted that the flip-flops change state on the trailing edge of a PT pulse, and that only one flip-flop will change state at any given time.

Operation of the multiplexing logic and phase count register just described with reference to FIG. 3 is illustrated by the waveforms shown in FIG. 4. The outputs of the flip-flops 31–34 control current to the windings 16 and 17 of the motor as shown in FIG. 3. The signal from the gate $G_1$ turns on a noninverting amplifier 41 which then turns on a transistor $Q_1$ to drive positive current through the motor winding 16. The output of the gate $G_3$ turns on a noninverting amplifier 42 which then turns on a transistor $Q_2$ to drive positive current through the motor winding 17 while positive current is still being driven through the motor winding 16. Then the positive current through the winding is turned off, but before negative current is driven through the motor winding 16 by the output of gate $G_2$ via amplifier 43 and transistor $Q_3$, an interval $\tau_1$ is timed by the interval counter 11. Once the negative current is turned on, the interval counter begins to time an interval $\tau_2$ after which the positive current to the motor winding 17 is turned off. An interval $\tau_1$ is then timed before negative current is driven through the motor winding 17 by the output of the gate $G_4$ via amplifier 44 and transistor $Q_4$.

The optimum interval $\tau_1$ to be allowed before switching current polarity in a motor winding may be determined for the particular motor and driver transistor characteristics and application, while the interval $\tau_2$ is effectively set for the motor speed desired. The intervals $\tau_1$ and $\tau_2$ are set by the combinational logic network 18 via the programming array 19 (FIG. 1). When it is time for a $\tau_1$ interval, as determined by the subcycle counter 20, the combinational logic network causes a number to be loaded into the interval counter preselected through the programming array such that when the counter has counted a predetermined number of clock pulses, the period $\tau_1$ will have been timed, and a PT pulse is generated to advance the subcycle counter. The combinational logic then causes another number to be loaded into the interval counter, where the other number is one of a plurality selected according to the nature of external stimuli, shown in this embodiment to be a feedback signal for closed loop speed control.

Open loop control could also be included by the obvious expedient of providing for the selection of the other number to be conditioned by any external stimuli. For simplicity, the only external open loop stimuli shown is from the motor control logic which merely indicates whether the motor is to be on or off. Predetermining the values from which the other number for the interval $\tau_2$ is to be selected provides speed control which can readily be tailored for the particular application. For example, a magnetic disk drive in one system may require one operating speed, and in another some other speed. Being able to program the interval $\tau_2$ permits the same arrangement to be manufactured for all disk drive systems. When a particular system is dedicated to a particular disk drive application, the speed control numbers are set through the programming array 19.

The combinational logic network 18 will now be described for this exemplary embodiment with reference to FIG. 5 which also shows the provisions for the programming array 19, and interval counter 11. The programming array is, in its simplest form, a connector having upper pins connected to set input terminals of stages of the interval counter, shown in this embodiment as a 12-bit synchronous-load counter, and lower pins connected to output terminals of the combinational logic network 18. Numbers to be set into the interval counter at different times are programmed by connecting certain lower pins energized at different times to proper upper pins. Since the counter only counts up to time an interval $\tau_1$ or $\tau_2$, it is set to the difference between the maximum number of states of the counter and the number of clock pulses to be counted.

The counter itself is comprised of three 4-bit conventional synchronous-load binary counters in cascade. The overflow (carry) from the last 4-bit counter is inverted by an inverter 51 and applied to load control terminals. The number selected by the combinational logic network is not entered into the counter until a clock pulse is received from the source 12 (FIG. 1). The gate $G_0$ (FIG. 1) is for synchronizing the overflow (carry) output.

While the "motor started" signal is low from the motor control logic 23 (FIG. 1), only NAND gate $G_9$ is enabled when ICC from the subcycle counter is high.

conversely while the "motor started" signal is high, two NAND gates $G_{10}$ and $G_{11}$ are enabled, but only if ICC from the subcycle counter is high indicating that a $\tau_2$ interval is to be timed next. If the speed detector 22 detects an under-speed condition, the "increase speed" signal is placed high. That is the feedback signal referred to in the general discussion of FIG. 1. In that case the NAND gate $G_{10}$ has all of its input terminals high so its output will be low. Otherwise, when the "increase speed" signal is low, the NAND gate $G_{11}$ is the only one that has all of its input terminals high to produce a low output.

Figure 5:
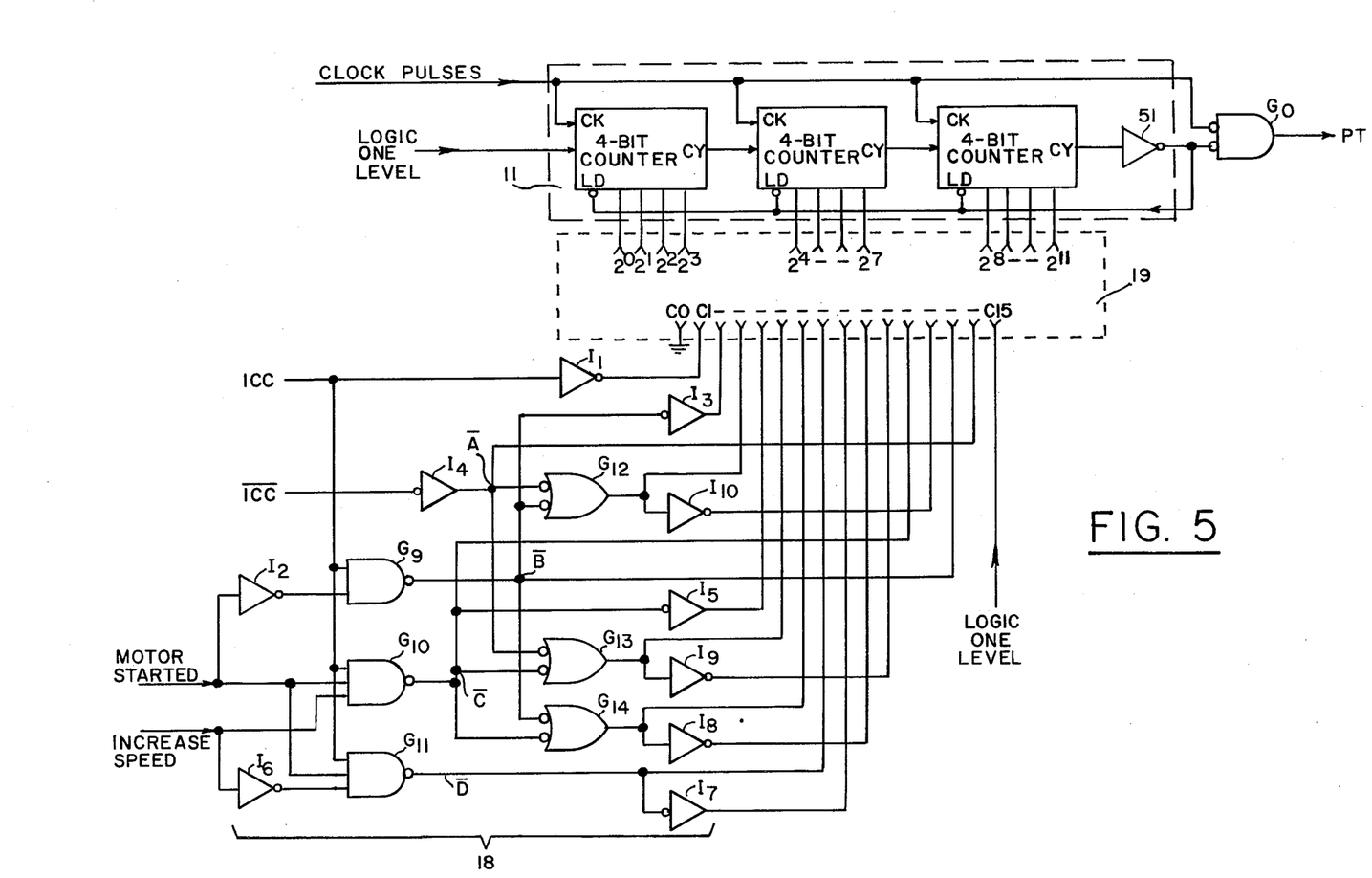
FIG. 5 is a logic diagram for exemplary combinational logic in the system of FIG. 1 for the illustrated application.

As shown in FIG. 5, the signals previously discussed, are combined in AND-OR mechanization, using additional NAND gates $G_{12}$, $G_{13}$, and $G_{14}$. Where necessary, signals are buffered and inverted by inverters as shown. The results of the combinational logic are then connected to the lower (case number) pins of the programming array 19.

To further understand the function of the combinational logic network 18, consider the following. At any time that the interval counter 11 is to be loaded with a number, its input pins must be either a logic zero or a logic one according to the specific situation.

The following four basic situations can occur in the exemplary embodiment disclosed herein:

A. Dead zone interval.
B. Starting frequency for motor excitation.
C. Running frequency for motor excitation above nominal speed value.
D. Running frequency for motor excitation below nominal speed value.

These situations are in essence four variables which can describe sixteen different cases, C0 through C15, of input to the interval counter as a function of the situations. Case number pins C0 and C15 are used for logic zero and one levels, respectively, to be applied to those input pins of the interval counter 11, which are to receive those logic levels. All other input pins are connected to the other case number pins such that, for each case of the four situations decoded by the combinational logic network 18, all input pins of the interval counter 11 are supplied with a logic one only for the appropriate case. Thus, for a particular application of the invention, each input pin of the interval counter 11 is connected to a particular case number pin (C0 through C15 of the programming array 19) according to the desired pattern of logic ones and logic zeros which have been determined to be appropriate for the particular application. (Note that in FIG. 5, each input pin of the interval counter 11 has been labelled with the decimal weight of that particular binary bit expressed as a power of two.)

For example, if it is determined that the counter input pin of decimal weight $32(2^5)$ should satisfy the following conditions at the time of loading the interval counter 11:

| SITUATION | DESIRED LOGIC LEVEL |
|---|---|
| A. Dead zone interval | Low |
| B. Starting frequency | Low |
| C. Running frequency above nominal | High |
| D. Running frequency below nominal | High | then that pin would be connected to a case pin number which is driven low for the first two situations, and high for the last two, by the combinational logic network 18. That would be pin C12 in the illustrated example.

The manner in which the aforementioned four situations may be expressed in terms of the input signals to the combinational logic network 18 are set forth in the following equations:

A = $[\overline{ICC}]$
B = $[ICC]\cdot[\overline{MS}]$
C = $[ICC]\cdot[MS]\cdot[IS]$
D = $[ICC]\cdot[MS]\cdot[\overline{IS}]$ where [MS] is the "motor started" signal and [IS] is the "increase speed" signal.

Situation A concerns only the delay (dead zone) intervals, $\tau_1$, and situations B, C and D concern the active intervals, $\tau_2$, the duration of which is different under the three separate situations. To energize the appropriate input terminals of the interval counter with proper zero and one logic levels at the appropriate times under the different situations with connections through the programming array, the combinational logic network must first be devised to energize the case number pins C0 through C15 according to the following table using the foregoing logic equations for the signals A, B, C and D, or the indicated equivalents.

TABLE 1

| Case No. | A | B | C | D | Equations | Elements |
|---|---|---|---|---|---|---|
| 0 | 0 | 0 | 0 | 0 | Logic Zero Level | |
| 1 | 1 | 0 | 0 | 0 | A | $I_1$ |
| 2 | 0 | 1 | 0 | 0 | B | $I_2 G_9 I_3$ |
| 3 | 1 | 1 | 0 | 0 | A + B | $I_4 G_{12}$ |
| 4 | 0 | 0 | 1 | 0 | C | $G_{10} I_5$ |
| 5 | 1 | 0 | 1 | 0 | A + C | $G_{13}$ |
| 6 | 0 | 1 | 1 | 0 | B + C | $G_{14}$ |
| 7 | 1 | 1 | 1 | 0 | A + B + C = $\overline{D}$ | $I_6 G_{11}$ |
| 8 | 0 | 0 | 0 | 1 | D | $I_7$ |
| 9 | 1 | 0 | 0 | 1 | A + D = $\overline{(B + C)}$ | $G_{14} I_8$ |
| 10 | 0 | 1 | 0 | 1 | B + D = $\overline{(A + C)}$ | $G_{13} I_9$ |
| 11 | 1 | 1 | 0 | 1 | A + B + D = $\overline{C}$ | $G_{10}$ |
| 12 | 0 | 0 | 1 | 1 | C + D = $\overline{(A + B)}$ | $G_{12} I_{10}$ |
| 13 | 1 | 0 | 1 | 1 | A + C + D = $\overline{B}$ | $G_9$ |
| 14 | 0 | 1 | 1 | 1 | B + C + D = $\overline{A}$ | $I_4$ |
| 15 | 1 | 1 | 1 | 1 | Logic One Level | |

Having effectively decoded the four possible situations according to the foregoing Table 1, the case number pins C0 through C15 are connected to the weighted input terminals of the interval counter to load the desired numbers. For example, assume the numbers to be entered for the desired intervals in the four situations are to be according to the following table.

TABLE 2

| SITUATION | $\tau_1$ | $\tau_2$ |
|---|---|---|
| A | 4056 | |
| B | | 3526 |
| C | | 3184 |
| D | | 3174 |

The weighted input terminals of the interval counter are connected according to the following table.

TABLE 3

| LOAD VALUE | BIT WEIGHT | | | | | | | | | | | |
|---|---|---|---|---|---|---|---|---|---|---|---|---|
| | $2^0$ | $2^1$ | $2^2$ | $2^3$ | $2^4$ | $2^5$ | $2^6$ | $2^7$ | $2^8$ | $2^9$ | $2^{10}$ | $2^{11}$ |
| 4056 | 0 | 0 | 0 | 1 | 1 | 0 | 1 | 1 | 1 | 1 | 1 | 1 |
| 3526 | 0 | 1 | 1 | 0 | 0 | 0 | 1 | 1 | 1 | 0 | 1 | 1 |
| 3184 | 0 | 0 | 0 | 0 | 1 | 1 | 1 | 0 | 0 | 0 | 1 | 1 |
| 3174 | 0 | 1 | 1 | 0 | 0 | 1 | 1 | 0 | 0 | 0 | 1 | 1 |
| Case No. Pin | C0 | C10 | C10 | C1 | C5 | C12 | C15 | C3 | C3 | C1 | C15 | C15 |

Thus, for each situation A, B, C, D, the sum of the bit weights is set equal to the load value. The appropriate case number pin is then determined by referring to Table 1.

It will be evident to those skilled in the art that combinational logic 18 and/or the programming array 19 can be implemented in different ways with a variety of different means, including but not restricted to: Programmable Read Only Memories (PROM); Read Only Memories (ROM); Random Access Memories (RAM); Programmable Logic Array (PLA); Field Programmable Logic Array (FPLA); Integrated Circuit Multiplexers, and Read Mostly Memories (RMM).

Similarly, the multiplexing logic portion of functional block 13 could be implemented by any of the aforementioned means. Also it will be evident to those skilled in the art that by expansion of the various elements, automatic control of interval $\tau_1$ with respect to interval $\tau_2$ as a function of some parameter, for example, motor load, can be accomplished.

Additionally evident to those skilled in the art is that by suitable arangement and expansion of elements 13, 14, 15, it is possible to provide for full-bridge drive to the motor windings rather than the half-bridge drive shown in the exemplary embodiment. Likewise it is obvious that the elements can be truncated to generate a complex single phase waveform.

Although particular embodiments of the invention have been illustrated and described, it is recognized that still other modifications and variations may readily occur to those skilled in the art, and that the basic concept of the invention may be practiced in still other forms. Consequently, it is intended that the claims be interpreted to cover such modifications, variations and forms.

The embodiments of the invention in which an exclusive property or privilege is claimed are described as follows:

1. A synthesizer for at least one multiphase waveform comprising
   a stable source of clock pulses,
   an interval counter for counting predetermined numbers of said clock pulses to produce sequential phase timing signals, each phase timing signal being timed counting one of a plurality of predetermined numbers of clock pulses as preset into said counter,
   programming means for storing a set of numbers to be preset into said interval counter, one number for each unique interval to be timed by said interval timer in producting said phase timing signals for use in synthesizing at least one multiphase waveform,
   a source of at least one control signal,
   means responsive to said phase timing signals and said control signal for selecting a different one of said numbers stored by said programming means to be preset into said counter in response to each unique condition of said phase timing signals and said control signals, and
   synthesizing means responsive to said phase timing signals and including at least one bistable element for combining intervals timed by said interval counter, said bistable element being alternately clocked by said timing signals in a predetermined cyclic pattern, thus synthesizing at the output of said bistable element a multiphase waveform.

2. A synthesizer as defined in claim 1 wherein said predetermined cyclic pattern has a subcyclic pattern, and wherein said selecting means responsive to said phase timing signals and at least one control signal includes a subcycle counter for counting said phase timing signals, and includes means for combining the states of said subcycle counter and at least said one control signal to select said predetermined numbers from said programming means to be preset into said interval counter.

3. A synthesizer for a plurality of multiphase waveforms as defined in claim 2 wherein said subcyclic pattern has only two phases and said subcycle counter is a single stage binary counter which changes state in response to each phase timing signal from said interval counter.

4. A synthesizer as defined in claim 1 including a load and means for driving said load in accordance with said waveform and wherein said control signal source is responsive to an external stimuli.

5. A synthesizer as defined in claim 1 including a load and means for driving said load in accordance with said waveform and wherein said control signal source is responsive to operation of said load for automatic feedback control.

6. A synthesizer as defined in claim 2 for a plurality of separate and distinct multiphase waveforms, said synthesizing means including a plurality of bistable elements one bistable element for each waveform, said bistable elements being interconnected for combining intervals timed by said interval counter in said predetermined cyclic pattern, thus synthesizing at the output of each bistable element a multiphase waveform which bears a fixed phase relationship to other waveforms at the outputs of other bistable elements.

7. A synthesizer for a plurality of multiphase waveforms as defined in claim 6 wherein said subcyclic pattern has only two phases and said subcycle counter is a single stage binary counter which changes state in response to each phase timing signal from said interval counter.

8. A synthesizer as defined in claim 6 including a load and means for driving said load in accordance with said waveform and wherein said control signal source is responsive to an external stimuli.

9. A synthesizer as defined in claim 6 including a load and means for driving said load in accordance with said waveform and wherein said control signal source is responsive to operation of said load for automatic feedback control.

10. A synthesizer as defined in claim 6 wherein the number of said bistable elements of said synthesizing means is four and said synthesizer includes means for interconnecting said bistable elements to respond to said phase timing signals and said subcycle counter in a predetermined pattern corresponding to said predetermined cyclic pattern.

11. A synthesizer for a plurality of multiphase waveforms as defined in claim 10 wherein said subcyclic pattern has only two phases and said subcycle counter is a single stage binary counter which changes state in response to each phase timing signal from said interval counter.

12. A synthesizer as defined in claim 11 including a load comprised of a 2-phase induction motor, said four multiphase waveforms being paired such that one pair provides positive and negative polarities for a first motor phase control, and the other pair provides positive and negative polarities for a second motor phase control, waveforms of said first pair being 90° out of phase with said second pair, and waveforms of each pair being 180° out of phase with each other including a delay of predetermined duration in inititating each full cycle of each waveform of each pair, and wherein said numbers preset into said interval counter are two, a first number of predetermined value selected for said delay of predetermined duration, and a second number of predetermined value selected for the desired speed of said motor.

13. A synthesizer as defined in claim 12 including a means for detecting the speed of said motor and producing in response thereto said one control signal as a signal indicative of said speed for selecting the value of said second number as a function of said one control signal.

14. Apparatus for synthesizing a plurality of multiphase waveforms comprising
a stable source of clock pulses,
an interval counter connected to count said clock pulses and adapted to be preset to a selected one of a plurality of predetermined numbers for timing desired intervals, and producing a phase timing signal at the end of each interval,
a plurality of bistable elements, each connected to receive said phase timing signals, and interconnecting means between elements to cause a different one of said elements to change state in a predetermined cyclic pattern in response to each phase timing signal,
programming means for storing said plurality of predetermined numbers, and
means responsive to at least one control signal and to each phase timing signal for selecting one of said numbers to be preset into said counter for timing the next interval, whereby each bistable element produces a multiphase waveform signal is said predetermined cyclic pattern.

15. Apparatus as defined in claim 14 wherein said cyclic pattern includes a subcyclic pattern, and said last named means includes a subcycle counter for counting said phase timing signals, and for generating said control signal, and wherein said last named means is further responsive to at least one other control signal for selecting a number from said programming means to be preset into said interval counter in response to each phase timing signal.

16. Apparatus as defined in claim 15 wherein said sybcyclic pattern is comprised of two phases, a first phase during which a predetermined number is selected by said last named means appropriate only for that first phase and a second phase during which a predetermined number is selected from among other numbers stored by said programming means according to the state of said other control signal.

17. Apparatus as defined in claim 16 wherein said plurality of bistable elements are four in number, each bistable element producing a separate and distinct multiphase waveform, and wherein said interconnecting means between elements causes a different one of said elements to change to a set state at the end of the first phase of each subcycle, said elements thus being set in cyclic sequence, and wherein said interconnecting means between elements causes the fourth element from the element just set in a subcycle to change to a reset state at the end of the second phase of the subcycle, whereby four phase staggered multiphase waveforms are produced with each waveform having two phases, a first phase shorter than a second phase by the interval of the first phase of said 2-phase subcycle counter.

18. Apparatus as defined in claim 17 including a load comprised of a 2-phase induction motor, said four multiphase waveforms being paired such that one pair provides positive and negative polarities for a first motor phase control, and the other pair provides positive and negative polarities for a second motor phase control, waveforms of said first pair being 90° out of phase with said second pair, and waveforms of each pair being 180° out of phase with each other.

19. Apparatus as defined in claim 18 wherein said number selected to be preset into said interval counter at the beginning of the first phase of said 2-phase subcycle counter is constant, and wherein said one other control signal is a motor speed control signal.

20. Apparatus as defined in claim 19 wherein said motor speed control signal is generated by motor control means in response to an external stimuli for open loop speed control.

21. Apparatus as defined in claim 19 wherein said one other control signal is generated as a motor speed control signal by speed detection means for comparing the actual speed of said motor with a desired speed to produce an error feedback signal for closed loop speed control.

* * * * *